United States Patent [19] [11] Patent Number: 5,009,906
Smith [45] Date of Patent: Apr. 23, 1991

[54] METHOD AND COMPOSITION FOR FILTERING BEER, ALE OR MALT LIQUOR TO REDUCE MULTIVALENT METAL CATIONS

[75] Inventor: Timothy R. Smith, Santa Barbara, Calif.

[73] Assignee: Manville Corporation, Denver, Colo.

[21] Appl. No.: 540,097

[22] Filed: Jun. 19, 1990

[51] Int. Cl.$^5$ .............................................. C12H 1/04
[52] U.S. Cl. ................................ 426/330.4; 426/423; 210/777
[58] Field of Search ...................... 426/330.4, 422, 423, 426/271, 592; 210/505, 504, 777

[56] References Cited

U.S. PATENT DOCUMENTS

| | | | |
|---|---|---|---|
| 2,573,406 | 10/1951 | Clough | 426/423 |
| 3,436,225 | 4/1969 | Raible | 426/330.4 |
| 3,878,300 | 4/1975 | Milligan | 426/330 |
| 3,940,498 | 2/1976 | Butterworth | 426/423 |
| 3,958,023 | 5/1976 | Butterworth | 426/330.4 |
| 4,027,046 | 5/1977 | Bohm | 426/330.4 |
| 4,112,129 | 9/1978 | Duensing | 426/423 |
| 4,282,261 | 8/1981 | Greene | 426/330.4 |
| 4,288,462 | 9/1981 | Hou | 426/330.4 |
| 4,508,742 | 8/1985 | McLaughlin | 426/423 |
| 4,631,193 | 12/1986 | Sobus | 426/330.4 |
| 4,645,567 | 2/1987 | Hou | 210/777 |
| 4,684,530 | 8/1987 | Welsh | 426/330.4 |
| 4,764,384 | 8/1988 | Gyann | 426/423 |
| 4,766,000 | 8/1988 | Sobus | 426/330.4 |
| 4,797,294 | 1/1989 | Berg | 426/330.4 |
| 4,880,650 | 11/1989 | Okamura | 426/330.4 |
| 4,880,652 | 11/1989 | Regutti | 426/417 |

*Primary Examiner*—Carolyn Paden
*Attorney, Agent, or Firm*—John D. Lister; Cornelius P. Quinn

[57] ABSTRACT

Described is a method of reducing multivalent metal cations from beer, ale or malt liquors comprising the steps of:
  providing an alkali metal silicate-treated finely divided diatomaceous earth (DTE); and
  contacting the beer, ale or malt liquor with the silicate-treated DTE by filtering the beer through the silicate-treated DTE thereby reducing the multivalent metal cation content of the beer, ale or malt liquor.

13 Claims, 1 Drawing Sheet

METHOD AND COMPOSITION FOR FILTERING BEER, ALE OR MALT LIQUOR TO REDUCE MULTIVALENT METAL CATIONS

FIELD OF THE INVENTION

This invention is concerned with the field of filter aids in liquids, e.g., malt liquors such as beer and ale filtration with diatomaceous earth (DTE) and acidic solutions containing molybdenum.

BACKGROUND OF THE INVENTION

In the field of beer, ale and malt liquors, finely divided DTE substances are used as filter aids The purpose of the filter aid is to decrease the liquor soluble multivalent cations, such as iron and aluminum The presence of such multivalent cations has a tendency to promote "chill haze" which means the formation of a cloudy fluid when the fluid is chilled. Filter aids such as DTE have been used in the past. Significant reductions in the presence of multivalent cations in the fluid has been difficult to obtain.

In the field of dilute aqueous acids, it is undesirable to have the high concentrations of molybdenum present. Dilute acidic solutions are used to extract manganese from ore. The extraction is performed by using a dilute aqueous acidic solution. The manganese that is extracted has as one of its end uses the preparation of alkaline batteries. The presence of molybdenum in such batteries is undesirable for it is believed to cause outgassing and leaking of the batteries.

It is the object of the present invention to obtain a significant reduction in the presence of multivalent cations in liquids such as beer, ale and malt liquor.

It is an object of the present invention to obtain significant reduction presence of molybdenum in dilute acidic aqueous solutions.

SUMMARY OF THE INVENTION

The present invention is concerned with an improved filter aid for beer, ale and malt liquor comprising a finely divided DTE treated with an aqueous solution of an alkali metal silicate.

The invention is also concerned with the method of reducing multivalent cations from liquids such as beer, ale and malt liquor comprising the steps of:
  providing an alkali metal silicate-treated finely divided diatomaceous earth (DTE); and
  contacting the liquid with the silicate-treated DTE by filtering the beer through the silicate-treated DTE thereby reducing the multivalent cation content of the liquor.

The invention is also concerned with the method for reducing multivalent cations from aqueous acidic solutions comprising the steps of:
  providing an alkali metal silicate treated finely divided diatomaceous earth (DTE); and
  contacting the liquid with the silicate treated DTE by filtering the acidic aqueous solution through the silicate treated DTE thereby reducing the multivalent cation content of the liquid.

The invention is also concerned with a method of manufacturing an improved DTE filter aid comprising the steps of:
  providing a finely divided DTE;
  contacting the DTE with an aqueous solution of alkali metal silicate; and
  recovering the silicate-treated DTE filter aid.

DESCRIPTION OF PREFERRED EMBODIMENTS

Figure 1:
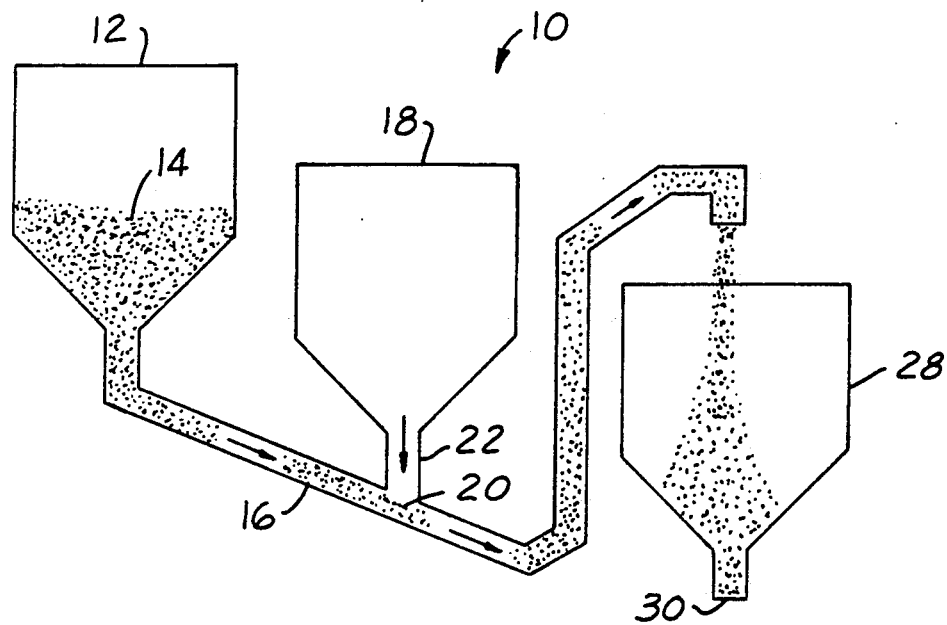
FIG. 1 is a schematic diagram depicting the process of the present invention of applying the silicate to the DTE.

The present invention is concerned with DTE filter aids that are used to reduce multivalent cations in beer, ale and malt liquors. In general, the production of beer, ale and malt liquors occurs by a process involving a complex series of enzymatic reactions. Starch is converted to malt extract which in turn is fermented with yeast wort. Mashing is the preparation of wort from malt and cereals by enzymatic hydrolysis, afterwards the product is boiled with hops which impart the characteristic taste and aroma of beer. The malt extract must contain the nutrients required for yeast growth. Mashing involves a complex interplay of chemical and enzymatic reactions which are not fully understood. In general, however, the present invention is concerned with such liquids resulting from the brewing process and to treat same with the improved finely divided DTE as described below.

The filter aid that is utilized in the present invention also can be used to decrease the amount of multivalent cations such as molybdenum from dilute aqueous acidic solutions. The acidic solutions are generally sulfuric acid solutions or other acid solutions that can extract manganese from ore. The amount of sulfuric acid that is utilized can vary from about 0.1 to about 20 weight percent, preferable 1 to about 10 percent and even more preferably about 3 to 5 percent. The use of the filter aid of the present invention, therefore, decreases the molybdenum that is ultimately going to be contained in use for the manganese, namely electrodes for alkaline batteries.

In general, the DTE filter aid that is the starting DTE of the present case are commercially available products such as Hyflo ™ (trademark of Manville Sales Corporation for "Flux-Calcined Filter Aid" having an origin of planton marine diatomite). A typical chemical analysis for the Hyflo Super Cel ™ material is listed below.

| Typical Chemical Analysis | |
|---|---|
| $SiO_2$ | 89.6 |
| $Al_2O_3$ | 4.0 |
| $Fe_2O_3$ | 1.5 |
| $P_2O_5$ | 0.2 |
| $TiO_2$ | 0.2 |
| CaO | 0.5 |
| MgO | 0.6 |
| $Na_2O + K_2O$ | 3.3 |

As can be seen, the DTE materials are high in silica dioxide ($SiO_2$) content.

The particle size of the DTE material in general can be characterized as finely divided but, more preferably, from about 1 to about 50 microns.

The DTE is subjected to an aqueous composition containing an alkali metal silicate. The alkali metal is preferably sodium or potassium silicate. The aqueous solutions of silicate may contain from about 1 to about 30% weight-to-volume, preferably about 5-30%, and even more preferably, about 8-20%.

The alkali metal silicate is applied to the DTE by any convenient technique for bringing the aqueous silicate solution in contact with the finely divided DTE. A preferred technique is to spray onto the filter aid the aqueous solution of silicate in an amount of about 0.1 to about 10% by weight of the solution in the filter aid, even more preferably, the amount would be from 0.5 to 5%, and even more preferably, about 0.5 to 1% by weight.

Turning now to FIG. 1, shown is a schematic diagram of the process of applying the alkali metal silicate to the DTE filtering material. In an apparatus broadly shown at (10), there is packer bin (12) containing particulates or finely divided DTE in the packer bin. On the way to a finished product, the DTE passes through conduit (16). A tank containing an aqueous solution of alkali metal silicate is shown at (18). That solution is sprayed onto the particles at point (20) as the particles are blown by the outlet (22) of the tank (18). The particles continue on their way through the conduit (16) and exit at (24) to be recovered in packer bin (28) which is the final product containing the treated particulate. As desired, the silicate-treated DTE particulates are extracted from bin (28) from exit port (30).

Figure 2:
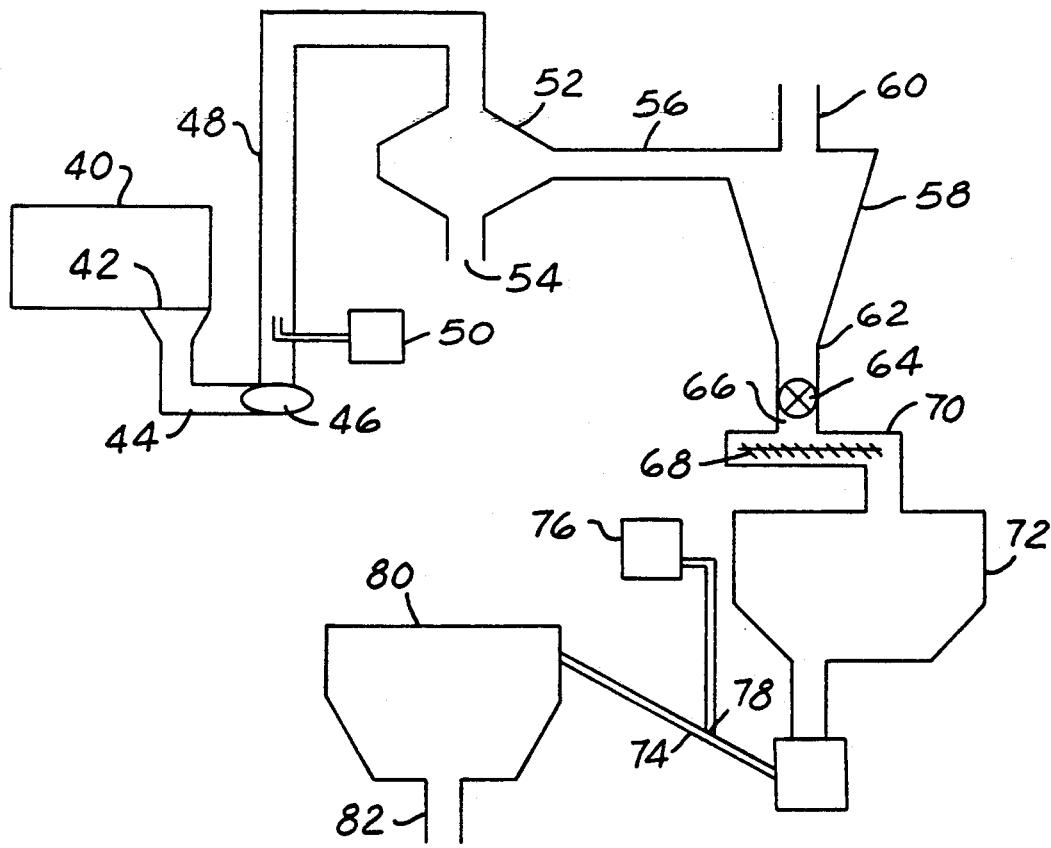
FIG. 2 is a schematic diagram of an alternative process of the present invention of applying the silicate to the DTE.

Turning now to FIG. 2 which is an alternative technique for the application of the silicate to the DTE. The overall process utilizes DTE that is flux calcined coming from a kiln (40) exiting at point (42). The utilization of flux can vary from product to product although sodium hydroxide, potassium hydroxide, or soda ash may be employed. A preferred flux is soda ash for the flux calcination of the DTE. The dried particles exit through (42) onto a movable bed depicted at (44) and is blown by pump (46) up conduit (48). The silicate solution is present in tank (50) and is sprayed onto the hot particles coming from the kiln. The aqueous silicate quickly evaporates onto the particles as the particles are en route to the delumper at (52). By virtue of screens and the movement of air, the delumper removes the large, oversized particles resulting from the calcination process. They exit at point (54) with the desirable particles moving by air through conduit (56) en route to a cyclone (58). The cyclone separation process has the fines going out at exit conduit (60) to a baghouse. The particles of desired size travel down the cyclone at point (62) wherein their movement is controlled by valve (64). The particles of desired size are then fed through exit (66) to an auger (68) that is placed in conduit (70). A second treatment of the particles with water is now depicted in the remainder of FIG. 2 and is somewhat comparable to that shown in FIG. 1. The packer bin (72) containing the particulates or finely divided DTE move through conduit (74). In route, they come in contact with water from tank (76) which is sprayed onto the particles at point (78) as the particles are in route to the packer bin (80). As desired, the silicate treated DTE particulates are extracted from bin (80) from exit port (82).

Having described the invention in general above, listed below are preferred embodiments wherein all temperatures are in degrees Centigrade and all parts are parts by weight unless otherwise indicated.

EXAMPLE 1

Using the apparatus as shown in FIG. 1, the dry feed from bin (12) passing through conduit (16) would flow at varying rates as shown in Table 1 below. A solution of sodium silicate at varying concentrations as shown in Table 1 below was passed from tank (18) and sprayed onto the moving particles at point (20).

Utilizing the output of particles produced following the mixing as shown in Table 1 wherein particles that were applied at the rate of 0.35% sodium silicate, the beer soluble iron was reduced to less than 30 parts per million (ppm) within 48 hours of application of the silicate to the particles.

TABLE 1

SOLUTION MIXING CHART

| | Solutions Feed Rate (gallons/min) | | | | |
|---|---|---|---|---|---|
| | 2.00 | 1.75 | 1.50 | | |
| | | | | 0.30% (w/w) Na$_2$SiO$_3$ | |
| | | | | Mix conc.* | Proportions** |
| Dry | 400 | 350 | — | 6.5 | 9.5/50.0 |
| Feed | 455 | 400 | 340 | 7.5 | 10.8/50.0 |
| Rate | 515 | 450 | 385 | 8.3 | 12.0/50.0 |
| (lb/min) | 570 | 500 | 430 | 9.3 | 13.3/50.0 |
| | 630 | 550 | 470 | 10.2 | 14.5/50.0 |
| | 685 | 600 | 515 | 11.1 | 15.5/50.0 |
| | — | 650 | 555 | 12.1 | 16.6/50.0 |
| | | | | 0.35% (w/w) Na$_2$SiO$_3$ | |
| | | | | Mix conc.* | Proportions** |
| Dry | 400 | 350 | — | 7.6 | 11.0/50.0 |
| Feed | 455 | 400 | 340 | 8.7 | 12.4/50.0 |
| Rate | 515 | 450 | 385 | 9.7 | 13.9/50.0 |
| (lb/min) | 570 | 500 | 430 | 10.8 | 15.0/50.0 |
| | 630 | 550 | 470 | 11.9 | 16.5/50.0 |
| | 685 | 600 | 515 | 13.0 | 17.8/50.0 |
| | — | 650 | 555 | 14.1 | 19.0/50.0 |
| | | | | 0.40 (w/w) Na$_2$SiO$_3$ | |
| | | | | Mix conc.* | Proportions** |
| Dry | 400 | 350 | — | 8.7 | 12.4/50.0 |
| Feed | 455 | 400 | 340 | 9.9 | 14.0/50.0 |
| Rate | 515 | 450 | 385 | 11.1 | 15.5/50.0 |
| (lb/min) | 570 | 500 | 430 | 12.3 | 16.9/50.0 |
| | 630 | 550 | 470 | 13.6 | 18.5/50.0 |
| | 685 | 600 | 515 | 14.9 | 19.9/50.0 |
| | — | 650 | 555 | 16.1 | 21.2/50.0 |

*Units of % (w/w) Na$_2$SiO$_3$
**Units of gallons of 40° Be sodium silicate solution/gallons of mix To determine the iron that is beer-soluble, a modification of the method of analysis of the American Society of Brewing Chemists (7th rev.ed. 1976) for filter aids-4 was made by utilizing Budweiser TM (trademark of Anheiser for beer).

Utilizing the product from the above technique at the 0.35% level, application of sodium silicate as depicted in FIG. 2, the beer-soluble iron was reduced from 62 ppm in the untreated version versus subjecting the particles to the treatment depicted in FIG. 2 where the beer-soluble iron was reduced to approximately 25 ppm.

Utilizing the product from the above technique at the 0.35% level application of sodium silicate, the beer-soluble aluminum was reduced from 7 ppm to approximately 3.2 ppm as a result of the treatment with sodium silicate. The test used to determine the concentration of aluminum soluble in the beer is a modification of the method of analysis of the American Society of Brewing Chemists by using inductively coupled plasma (ICP for detection of aluminum).

EXAMPLE 2

It has also been determined following the procedures outlined above in Example 1, using the apparatus of FIG. 2, molybdenum likewise is decreased by the use of the sodium silicate application. The amount of molybdenum that was present and soluble in a 3% aqueous sulfuric acid solution was reduced from 1.2 mg molybdenum to 0.04 mg molybdenum/liter. The testing procedure for determining the molybdenum content is outlined below.

For solubility testing, a 15 g. sample of Hyflo ™ is slurried in 100 mL of 3%(v/v) sulfuric acid solution contained in a 4 oz. Nalgene polypropylene bottle. The bottle is placed in a water bath held at a temperature of 95 C. and after 120 min. the slurry is filtered through a glass fiber filter, and the resulting solution analyzed by inductively-coupled argon plasma emission spectrophotometry (ICP) for soluble molybdenum concentration after cooling to room temperature.

A Baird Model PSX inductively-coupled plasma spectrophotometer, equipped with a thermostatted Acton 0.75 m. modified Czerny-Turner monochromator evacuated to a maximum of 60 millitorr, is used. A forward power of 700 W, provided by a crystal-controlled radio-frequency generator operating at 40.68 MHz, is applied to the argon plasma solutions are introduced to a GMK high-solids nebulizer using a Gilson peristaltic pump. Nebulizer pressure is maintained at 70 psi, and the sample introduction system flushed with 5 mL of a 5% ammonium bifluoride solution followed by deionized water between sample aspirations to reduce residual silicate deposition.

A precision determination of the molybdenum wave length is required for this analysis, with absolute reference wave lengths established at zero order at the grating edge of 160.000 nm. Molybdenum intensities are detected using an extended red, high-sensitivity photomultiplier tube with a multialkali photocathode (Hamamatsu R928) equipped with a UV glass window and a 9-stage circular cage dynode structure, with current amplification at approximately $7.0 \times 10EE+6$. Molybdenum is determined in second order at the Mo 202.030 nm line, optically occurring at Mo 202.036 nm, with corresponding background correction at 201.972 nm and 202.161 nm. The centroid of peak intensity places the optical line position at about Mo 202.037 nm on this instrument. Interferences are evaluated using a 15%(w/v) acid manganese sulfate solution, a 1000 mg Fe/L iron solution, and a 1000 mg Al/L aluminum solution. The selected instrument operating parameters reduces interferences from these species to negligible levels. Five standards are used to calibrate the instrument for molybdenum, containing 0.020, 0.200, 2.00, 40.0 and 0.9 mg Mo/L as prepared by serial dilution from a 1000 mg/L stock solution (Spex PLM09-2X, Lot 1-72-LP), and the data are typically fit to a quadratic equation with a weighing factor of $1/x$ applied for increased accuracy at low levels. A typical instrument calibration yields a detection limit of 0.00025 mg Mo/L, and a background equivalent concentration of 0.0064 mg Mo/L.

Results for samples are expressed in units of mg molybdenum contained in the extract.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting and that various changes may be made without departing from the spirit or scope of the invention.

For example, it has been found that for the most effective beer soluble iron reduction, the final product should have a moisture content of not less than 0.5% and a concentration of sodium silicate of not less than 0.3% or more than 0.4%. These values correspond to 6-to-8 pounds of sodium silicate (as dry $Na_2SiO_3$) and 1.2 gallons of water contained in each ton (2,000 lbs.) of finished product.

While applicant does not wish to be bound to any particular theory of the invention, it is believed that the silicate modification of the surface of the DTE happens at the molecular level and occurs by repairing surface destruction resulting from the catastrophic formation of cristobalite. This cristobalite forms during the flux calcination of the raw material DTE and is like quartz, that is, a high amount of $SiO_2$. The surface thus prepared may accept water as a beer-soluble iron-reducing agent. Only the small cubes and prisms of silicate ion oligomers are capable of rapidly finding sites within which they may be coordinated. This may be the reason why it takes a period of time for the contacting of the silicate and the DTE to result in a satisfactory reduction of the beer-soluble iron qualities of the silicate-treated DTE. For best results, up to 72 hours are needed for contact with the silicate and the DTE.

What is claimed is:

1. A method of reducing multivalent metal cations from beer, ale or malt liquor comprising the steps of:
   providing an alkali metal silicate-treated finely divided diatomaceous earth (DTE), and
   contacting the beer, ale or malt liquor with the silicate-treated DTE by filtering the beer through the silicate-treated DTE thereby reducing the multivalent metal cation content of the beer, ale or malt liquor.

2. The method of claim 1 wherein the metal cations that are reduced are selected from the group consisting of iron and aluminum.

3. The method of the above claim 2 wherein the multivalent cation is iron.

4. The method of claim 1 wherein the alkali metal silicate that is applied to the DTE is an aqueous solution of alkali metal silicate having from 0.1 to 30% by weight of the silicate present in the solution.

5. The method of claim 1 wherein the DTE has a particle size ranging from 1 to 50 microns.

6. The method of manufacturing an improved filter aid comprising the steps:
   providing a finely divided diatomaceous earth (DTE);
   contacting the DTE with an aqueous solution of alkali metal silicate; and
   recovering the silicate-treated DTE filter aid wherein the silicate-treated DTE is characterized as having the ability to reduce multivalent metal cations from beer, ale or malt liquor.

7. An improved beer, ale or malt liquor filter aid comprising a finely-divided diatomaceous earth (DTE) treated with an aqueous alkali metal silicate wherein the filter aid can be characterized as one that can decrease the multivalent metal cations from beer, ale or malt liquor.

8. A method for reducing multivalent metal cations from dilute acidic aqueous solution comprising the steps of:
   providing an alkali metal silicate treated, finely divided diatomaceous earth (DTE), and
   contacting the dilute aqueous acidic solution with the silicate treated DTE by filtering the acidic aqueous solution through the silicate treated DTE thereby reducing the multivalent metal cation content of the acidic solution.

9. The method of claim 8, wherein the metal cation to be reduced from the acidic solution is molybdenum.

10. The method of claim 8, wherein the alkali metal silicate that is applied to the DTE is an aqueous solution of alkali metal silicate having from 0.1 to 30% by weight of the silicate present in the solution.

11. The method of claim 8 wherein the DTE has a particle size ranging from 1 to 50 microns.

12. The method of claim 8 wherein the aqueous acidic solution is dilute sulfuric acid.

13. The method of claim 12 wherein the acidic solution is from 0.1 to 20 percent by weight sulfuric acid in water.

* * * * *

UNITED STATES PATENT AND TRADEMARK OFFICE
CERTIFICATE OF CORRECTION

PATENT NO. : 5,009,906  
DATED : April 23, 1991  
INVENTOR(S) : Timothy R. Smith Page 1 of 2

It is certified that error appears in the above—identified patent and that said Letters Patent is hereby corrected as shown below:

In Column 1, Line 14, insert --. -- between the words "aids" and "The".

In Column 1, Line 16, insert --. -- between the words "aluminum" and "The".

In Column 2, Line 21, please delete the word "impart" and insert therein the word --imparts--.

In Column 3, Line 59, please delete the word "In" and insert therein the word --En--.

In Column 3, Line 61, please delete the word "in" and insert therein the word --en--.

In Column 4, under Table I, at Line 18, please move the heading beginning with the word "Solutions" to just below the second bold line next to the column title beginning with "0.30%" and above the numbers "400, 350 and --".

In Column 4, under Table I, at Line 29, please move the heading beginning with the word "Solutions" to just below the second bold line next to the column title beginning with "0.35%" and above the numbers "400, 350 and --".

In Column 4, under Table I, at Line 37, please move the heading beginning with the word "Solutions" to just below the second bold line next to the column title beginning with "0.40" and above the numbers "400, 350 and --".

UNITED STATES PATENT AND TRADEMARK OFFICE
CERTIFICATE OF CORRECTION

PATENT NO. : 5,009,906
DATED : April 23, 1991
INVENTOR(S) : Timothy R. Smith

It is certified that error appears in the above-identified patent and that said Letters Patent is hereby corrected as shown below:

In Column 4, under Table I, at Line 37, please delete "0.40" and insert therein --0.40%--.

Signed and Sealed this

Ninth Day of February, 1993

Attest:

STEPHEN G. KUNIN

*Attesting Officer*     *Acting Commissioner of Patents and Trademarks*